United States Patent
Park et al.

(10) Patent No.: US 11,046,184 B1
(45) Date of Patent: Jun. 29, 2021

(54) VEHICLE CLUSTER HAVING SEGMENT LCD

(71) Applicants: Hyundai Motor Company, Seoul (KR); Kia Motors Corporation, Seoul (KR)

(72) Inventors: Chong Bae Park, Suwon-si (KR); Min Ah Ryu, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/952,185

(22) Filed: Nov. 19, 2020

(30) Foreign Application Priority Data

Dec. 10, 2019 (KR) .................. 10-2019-0163506

(51) Int. Cl.
*B60K 35/00* (2006.01)
*G02F 1/1335* (2006.01)
*G02F 1/13357* (2006.01)

(52) U.S. Cl.
CPC ........ *B60K 35/00* (2013.01); *G02F 1/133528* (2013.01); *G02F 1/133603* (2013.01); *B60K 2370/1523* (2019.05); *B60K 2370/178* (2019.05); *B60K 2370/332* (2019.05); *B60K 2370/343* (2019.05)

(58) Field of Classification Search
CPC .............. B60K 35/00; B60K 2370/178; B60K 2370/1523; B60K 2370/332; B60K 2370/343; G02F 1/133528; G02F 1/133603
See application file for complete search history.

(56) References Cited

U.S. PATENT DOCUMENTS

2014/0355307 A1* 12/2014 Sah ..................... G02B 6/0068
    362/613
2019/0248240 A1* 8/2019 Fujita .................... B60K 35/00

* cited by examiner

*Primary Examiner* — Phu Vu
(74) *Attorney, Agent, or Firm* — Slater Matsil, LLP

(57) ABSTRACT

A cluster includes a segment liquid crystal display (LCD) panel including a plurality of segments, a liquid crystal region comprising liquid crystals, and at least one liquid crystal dam region configured such that the liquid crystals are not arranged therein, a substrate arranged under the segment LCD panel, at least one first light source, corresponding to a backlight of the segment LCD panel, arranged on the substrate, and at least one second light source, lighting of which is individually controlled, arranged on the substrate, wherein at least a portion of the at least one liquid crystal dam region overlaps each second light source in a vertical direction.

19 Claims, 5 Drawing Sheets

VEHICLE CLUSTER HAVING SEGMENT LCD

CROSS-REFERENCE TO RELATED APPLICATIONS

This application claims the benefit of Korean Application No. 10-2019-0163506, filed on Dec. 10, 2019, which application is hereby incorporated herein by reference.

TECHNICAL FIELD

The present invention relates to a cluster for vehicles employing a segment liquid crystal display (LCD).

BACKGROUND

In general, a cluster for vehicles provides information regarding the operating state (e.g., revolutions per minute (RPM)) of a powertrain and a vehicle speed, and has warning lights indicating whether or not various functions are activated or fail.

Such a cluster focuses on visibility and functionality and is thus configured based on analog-type dial gauges and simple warning lights. However, display panels, such as a thin film transistor-liquid crystal display (TFT-LCD), etc., tend to be applied to clusters at present so as to show brand differentiation or to provide various visual effects for a variety of user experiences.

Figure 1A:
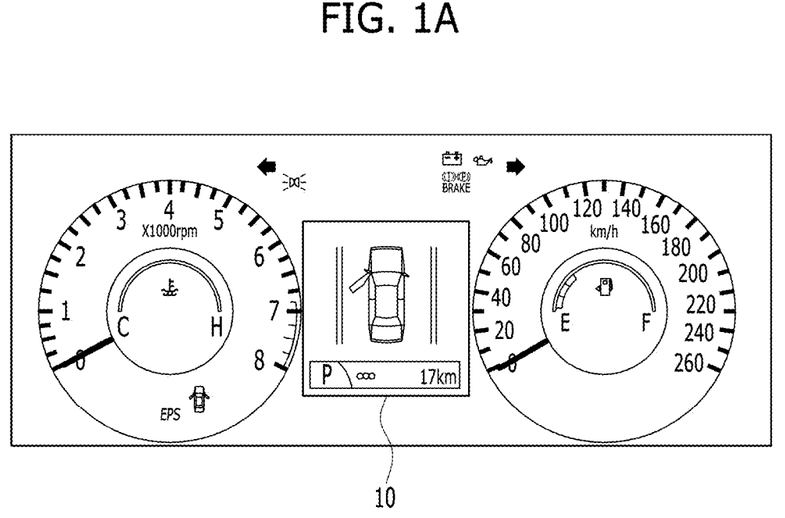
FIGS. 1A to 1C are views illustrating configurations of clusters including various types of display panels.
Figure 1B:
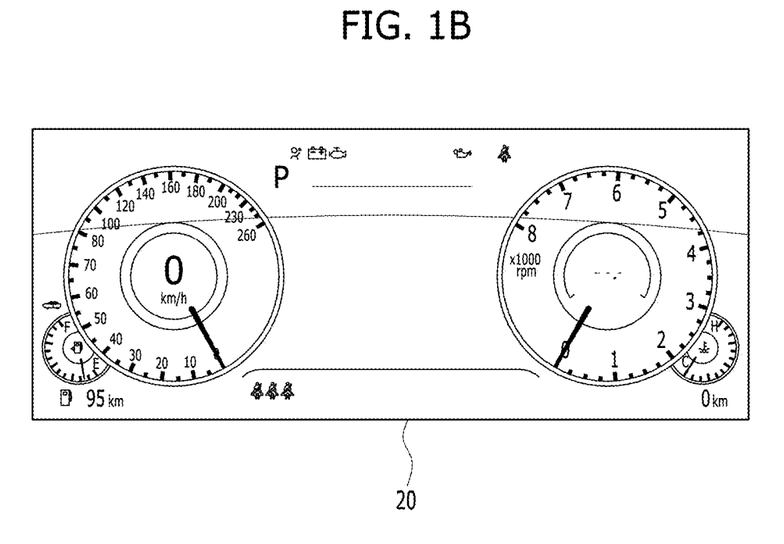
Figure 1C:
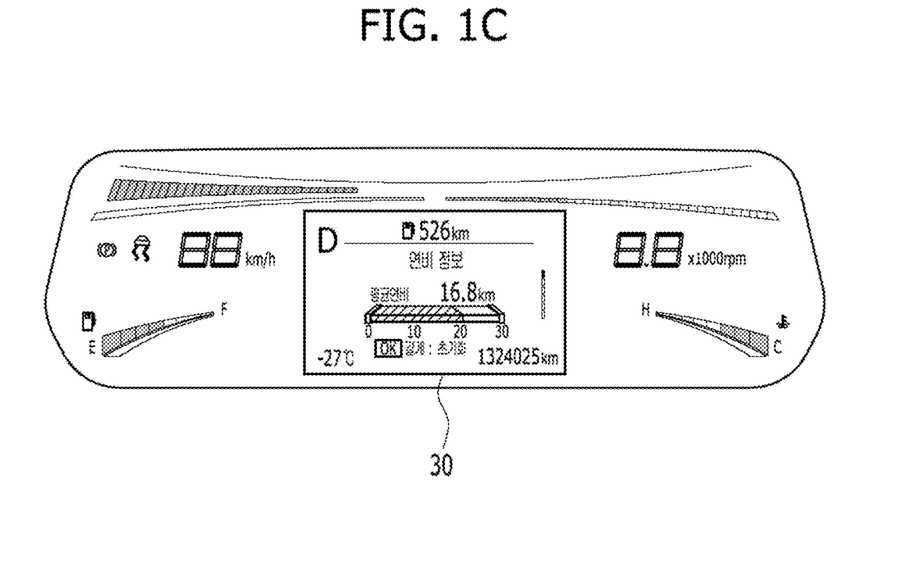

FIGS. 1A to 1C are views illustrating the configurations of clusters including various types of display panels.

First, FIG. 1A illustrates a cluster in which an RPM gauge located at the left side of the cluster and a vehicle speed gauge located at the right side of the cluster are implemented in an analog type and a TFT-LCD 10 is disposed at the center of the cluster. Such a cluster may be manufactured at relatively low cost, but has difficulty providing an image of advanced specifications to customers.

Next, FIG. 1B illustrates a full LCD-type cluster, the entirety of which is formed of a TFT-LCD 20. Such a cluster may provide an advanced appearance and express various graphic images, but is manufactured at relatively high cost.

FIG. 1C illustrates a cluster which is formed of a segment LCD on the whole, and only a region of which is formed as a TFT-LCD 30. Here, the segment LCD is a kind of liquid crystal display in which a plurality of segments having a predetermined shape is selectively activated and an image desired to be output is implemented through the combination of the activated segments. Such a cluster may provide a visual image similar to that of the full LCD-type cluster but be manufactured at a lower cost than the full LCD-type cluster, and may be regarded as a compromise between the cluster shown in FIG. 1A and the cluster shown in FIG. 1B.

Clusters provide drivers with information essential for driving, and thus must satisfy safety-related standards. As a representative example of such safety-related standards, there is ISO 26262. ISO 26262 is an international standard pertaining to core parts related to automotive safety, represents requirements for automotive functional safety, consists of several parts to manage the functional safety of systems, and specifies product development protocols at the system, hardware and software levels. Among automotive safety integrity levels (ASILs) of vehicles defined in ISO 26262, parts related to clusters pertain to ASIL-B.

In more detail, ASIL-B requires monitoring as to whether or not driving/brake-related warning lights, for example, a warning light for a parking brake, an anti-lock brake system (ABS), an electric parking brake (EPB), an electronic stability control (ESC) system, etc., is turned on or fails (i.e., on/off/fail).

In order to satisfy these regulations, in the cluster shown in FIG. 1A, a light emitting diode (LED) may be separately assigned to each of warning lights which are subjects of application of the regulations, and the operation of each warning light may be monitored through an LED driver.

Further, in the full LCD-type cluster shown in FIG. 1B, warning lights are implemented as display images, and the operation of each warning light may be monitored by sensing image distortion between the display and a processor or abnormality of an LCD panel through a safety timing controller (T-CON).

However, when respective driving/brake-related warning lights are implemented as some segments on the segment LCD in the segment LCD-type cluster shown in FIG. 1C, the conventional segment LCD does not implement a function of monitoring whether or not the respective segments are individually turned on or fail, and is thus incapable of satisfying the regulations of ASIL-B.

SUMMARY

The present invention relates to a cluster for vehicles employing a segment LCD. Particular embodiments relate to a cluster for vehicles which is capable of sensing failure of a specific warning light. Accordingly, embodiments of the present invention provide a vehicle cluster having a segment LCD that substantially obviates one or more problems due to limitations and disadvantages of the related art.

An embodiment of the present invention provides a segment LCD-type cluster which is capable of individually monitoring warning lights.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structures particularly pointed out in the written description and claims hereof as well as the appended drawings.

In accordance with an embodiment of the invention, a cluster includes a segment LCD panel including a plurality of segments, and a substrate arranged under the segment LCD panel and including at least one first light source, corresponding to a backlight of the segment LCD panel, and at least one second light source, lighting of which is individually controlled, arranged thereon, wherein the segment LCD panel includes a liquid crystal region including liquid crystals, and at least one liquid crystal dam region configured such that the liquid crystals are not arranged therein, wherein at least a portion of the at least one liquid crystal dam region overlaps each of the at least one second light source in a vertical direction.

Each of the at least one second light source may correspond to a corresponding one of predetermined kinds of warning lights.

The predetermined kinds of warning lights may include driving and brake-related warning lights.

The cluster may further include a driver configured to drive the at least one second light source, the at least one second light source may include light emitting diodes, and the driver may monitor an operating state of each of the light emitting diodes.

The cluster may further include an upper polarizing layer arranged on the segment LCD panel, and a lower polarizing layer arranged under the segment LCD panel.

A through hole may be formed through the lower polarizing layer at a position configured to overlap each of the at least one second light source in the vertical direction.

The cluster may further include a light control layer arranged under the lower polarizing layer so as to adjust a viewing angle.

A phase axis of light transmitted by the upper polarizing layer and a phase axis of light transmitted by the lower polarizing layer may intersect each other.

The cluster may further include a diffuser arranged between the lower polarizing layer and the substrate.

The cluster may further include a first partition arranged between each of the at least one second light source and the at least one first light source, so as to be interposed between the substrate and the diffuser.

The segment LCD panel may further include a second partition arranged between the liquid crystal region and the at least one liquid crystal dam region and configured to prevent the liquid crystals from entering the at least one liquid crystal dam region.

The cluster may further include a cover glass arranged on the segment LCD panel.

The cluster may further include a shielding layer arranged in regions in a plane other than regions corresponding to the predetermined kinds of warning lights and shapes of the respective segments, under the cover glass.

The cluster may further include a thin film transistor (TFT)-LCD panel arranged in a plane so as not to overlap the segment LCD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Reference will now be made in detail to preferred embodiments of the present invention, examples of which are illustrated in the accompanying drawings. However, the disclosure of the invention is not limited to the embodiments set forth herein and may be variously modified. In the drawings, in order to clearly describe the present invention, descriptions of elements which are not related to the present invention are omitted, and the same or similar elements are denoted by the same reference numerals even when they are depicted in different drawings.

In the following description of the embodiments, it will be understood that, when a part "includes" an element, the part may further include other elements and does not exclude the presence of such other elements, unless stated otherwise. Further, in the following description of the embodiments, parts denoted by the same reference numerals mean the same elements.

One embodiment of the present invention proposes a cluster employing a segment LCD in which only specific warning lights respectively use light sources, the operating states of which may be monitored through a driver, a gap is formed such that liquid crystals are not arranged in a segment LCD panel located in light emission paths of the corresponding light sources, and thus these warning lights can be turned on without interfering with the operation of the segment LCD panel.

Figure 2A:
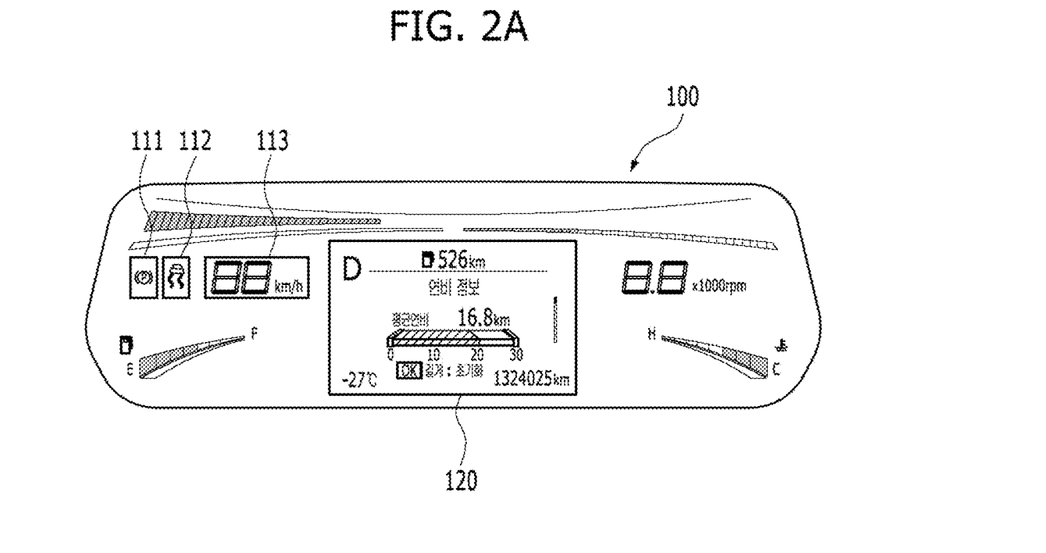
FIGS. 2A and 2B are views illustrating examples of a cluster type according to one embodiment of the present invention.
Figure 2B:
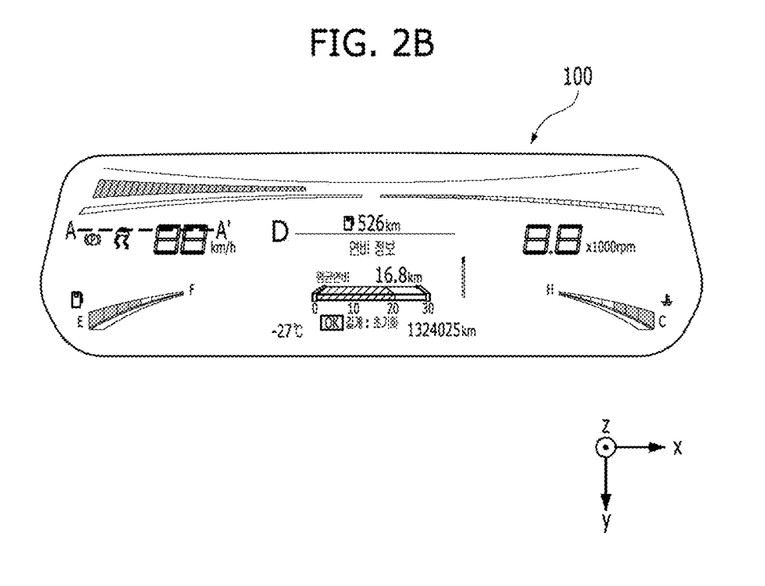

FIGS. 2A and 2B are views illustrating examples of a cluster type according to one embodiment of the present invention.

Referring to FIG. 2A, a cluster 100 according to one embodiment of the present invention may include a first region 120 in which a first-type display panel capable of expressing a free graphic image is arranged, and a remaining region which does not overlap the first region in a plane, i.e., a second region in which a second-type display panel having a plurality of segments is arranged.

For example, the first-type display panel may be a TFT-LCD panel, without being limited thereto. For example, the first-type display panel may be an organic light emitting diode (OLED) panel.

Further, the second-type display panel may be a segment LCD, and hereafter, it will be assumed that the segment LCD is arranged in the second region unless stated otherwise.

In the second region, various pieces of information necessary to drive a vehicle, such as a digital-type speedometer 113, are displayed through the segments, and predetermined specific kinds of warning lights 111 and 112 may be turned on through separate light sources, rather than the segments of the segment LCD. Here, the specific kinds of warning lights 111 and 112 may be a parking brake warning light 111, an electronic stability control (ESC) warning light 112, etc., which are subjects of application of the regulations of ASIL-B, but these warning lights 111 and 112 are described only to aid in understanding of the invention and thus the kinds and number of the warning lights 111 and 112 are not limited thereto.

Here, the specific kinds of warning lights 111 and 112 may overlap a segment LCD panel forming the segment LCD in the vertical direction (i.e., in the Z-axis direction). If the specific kinds of warning lights 111 and 112 are arranged at separate positions not overlapping the segment LCD panel forming the segment LCD in the vertical direction, the operating states of the specific kinds of warning lights 111 and 112 may be monitored through an LED driver, as shown in FIG. 1A, but in this case, the arrangement positions of the warning lights 111 and 112 are restricted (e.g., the warning lights 111 and 112 are located only at the edge or the center of the cluster 100), or the shape of the segment LCD panel is complicated, and thus it is difficult to manufacture the segment LCD panel. On the other hand, in the cluster 100 according to one embodiment of the present invention, the positions of the warning lights 111 and 112 overlap the segment LCD panel, and thus, design freedom in the arrangement of the warning lights 111 and 112 on the cluster 100 is improved. However, when the general segment LCD panel is applied to the cluster 100, it is difficult to emit light from light sources applied to the warning lights 111 and 112 towards the surface of the cluster 100 due to liquid crystals filling the inside of the segment LCD panel and two polarizing layers arranged in the segment LCD panel to be orthogonal to each other.

Therefore, in the cluster 100 according to one embodiment of the present invention, at least portions of the liquid crystals and the polarizing layers are not arranged in light emission paths of the specific warning lights 111 and 112, thereby being capable of solving problems in terms of monitoring the operation of the warning lights 111 and 112 and visibility. This will be described with reference to FIGS. 3 and 4.

Figure 3:
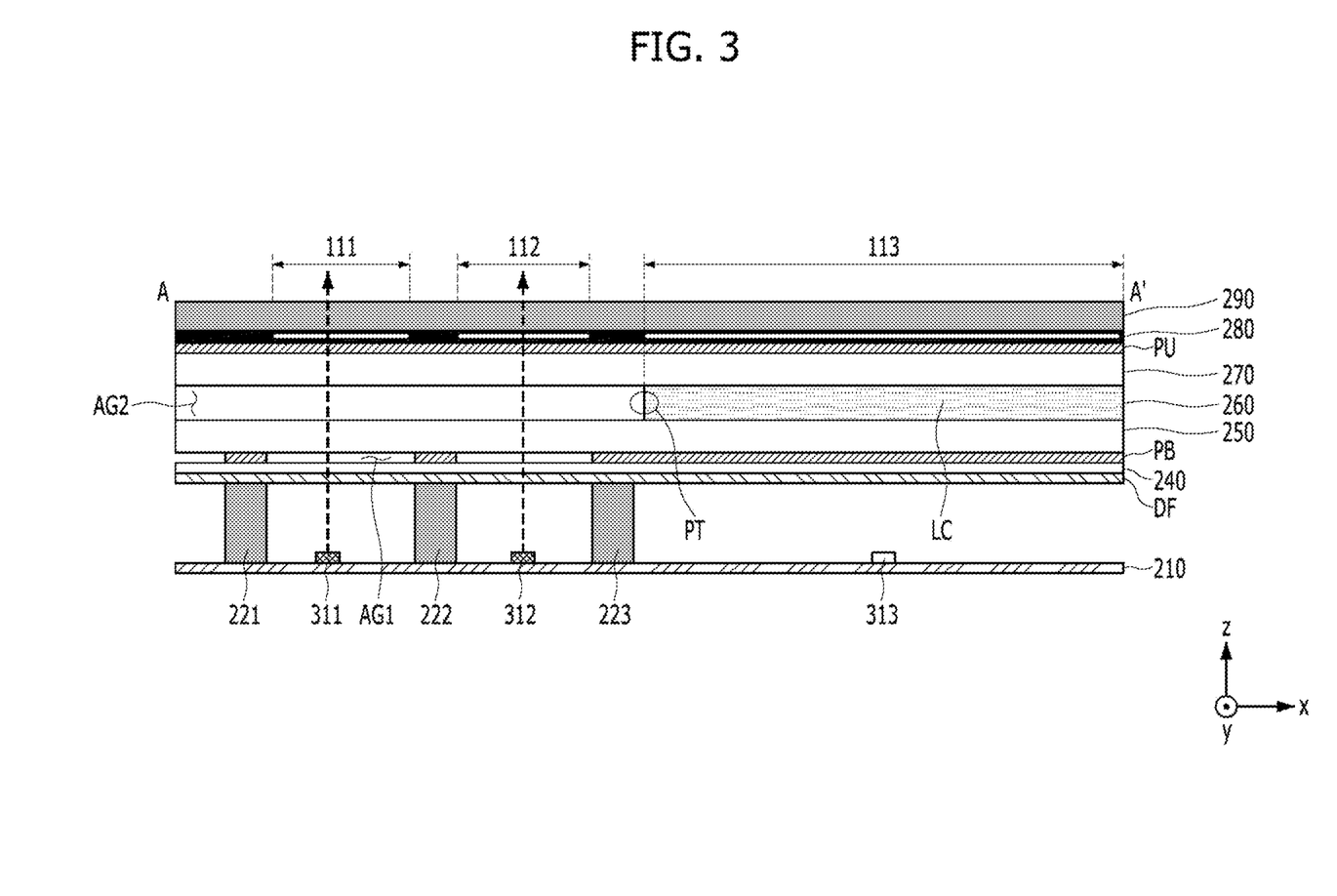
FIG. 3 is a longitudinal-sectional view illustrating an example of a cluster structure according to one embodiment of the present invention.

FIG. 3 is a longitudinal-sectional view illustrating an example of a cluster structure according to one embodiment of the present invention, and in more detail, FIG. 3 is a longitudinal-sectional view of the cluster according to one embodiment of the present invention, taken along line A-A' of FIG. 2B.

Referring to FIG. 3, the cluster according to this embodiment may include a substrate 210, first partitions 221, 222 and 223, a diffuser DF, a light control layer 240, a lower polarizing layer PB, a segment LCD panel 250, 260 and 270, an upper polarizing layer PU, a shielding layer 280 and a cover glass 290, which are arranged in the upward direction.

A plurality of light sources 311, 312 and 313 is arranged on the substrate 210, and the light sources 311, 312 and 313 may include a first light source 313 corresponding to a backlight of the segment LCD and a plurality of second light sources 311 and 312 respectively corresponding to the warning lights 111 and 112, for which monitoring of the operating states (On/Off/Fail) is required.

Although FIG. 3 illustrates only one first light source 313, a plurality of first light sources may be arranged in a designated configuration, depending on the size of the segment LCD panel, in actual implementation. Particularly, the first light source 313 may be arranged so as to provide a backlight function to at least a region 113 in which each segment of the segment LCD is arranged (hereinafter, referred to as a "graphic region").

The second light sources 311 and 312 may include light emitting elements, the operating states of which may be monitored through a driver (not shown), for example, LEDs, but are not limited thereto. Particularly, the second light sources 311 and 312 may be arranged so as to selectively emit light to at least regions in which the respective warning lights 111 and 112 are displayed. That is, optical axes of the respective second light sources 311 and 312 may overlap the regions in which the corresponding warning lights 111 and 112 are displayed in the vertical direction (i.e., in the Z-axis direction).

The first partitions 221, 222 and 223 are arranged between the diffuser DF and the substrate 210, and the first partitions 221, 222 and 223 perform a function of blocking light so as to prevent light, emitted from each of the first light source 313 and the second light sources 311 and 312, from invading emission regions intended to be illuminated by other light sources. For example, the first partitions 222 and 223, arranged around the second light source 312 corresponding to the warning light 112 which is located second from the left, may prevent light emitted from the second light source 312 when the second light source 312 is turned on from entering the warning light 111 which is located first from the left or the graphic region 113 of the segment LCD.

The diffuser DF uniformly diffuses light emitted from the respective light sources 311, 312 and 313, and may thus prevent deviation of intensities of radiation between a region adjacent to the optical axis of each light source and other regions.

The light control layer 240 may be arranged on the diffuser DF. The light control layer 240 may be a film having fine heat radiation holes formed therethrough, and control the viewing angle of the cluster by adjusting dispersion of light. When the viewing angle of the cluster is adjusted within a designated range by the light control layer 240, a phenomenon, in which light emitted by the cluster is unnecessarily reflected by a vehicle window and obstructs a driver's field of vision at night, may be reduced. In some embodiments, the light control layer 240 may be omitted. Alternatively, according to another embodiment, the light control layer 240 in a region vertically overlapping the graphic region, in which the first light source 313 functions as the backlight, may be replaced by a double brightness enhancement film (DBEF). In this case, the thicknesses of the light control layer 240 and the DBEF may be the same.

The polarizing layers PB and PU and the segment LCD panel 250, 260 and 270 interposed between the polarizing layers PB and PU may be arranged on the light control layer 240. The structures of the polarizing layers PB and PU and the segment LCD panel 250, 260 and 270 will be described with reference to FIGS. 3 and 4.

Figure 4:
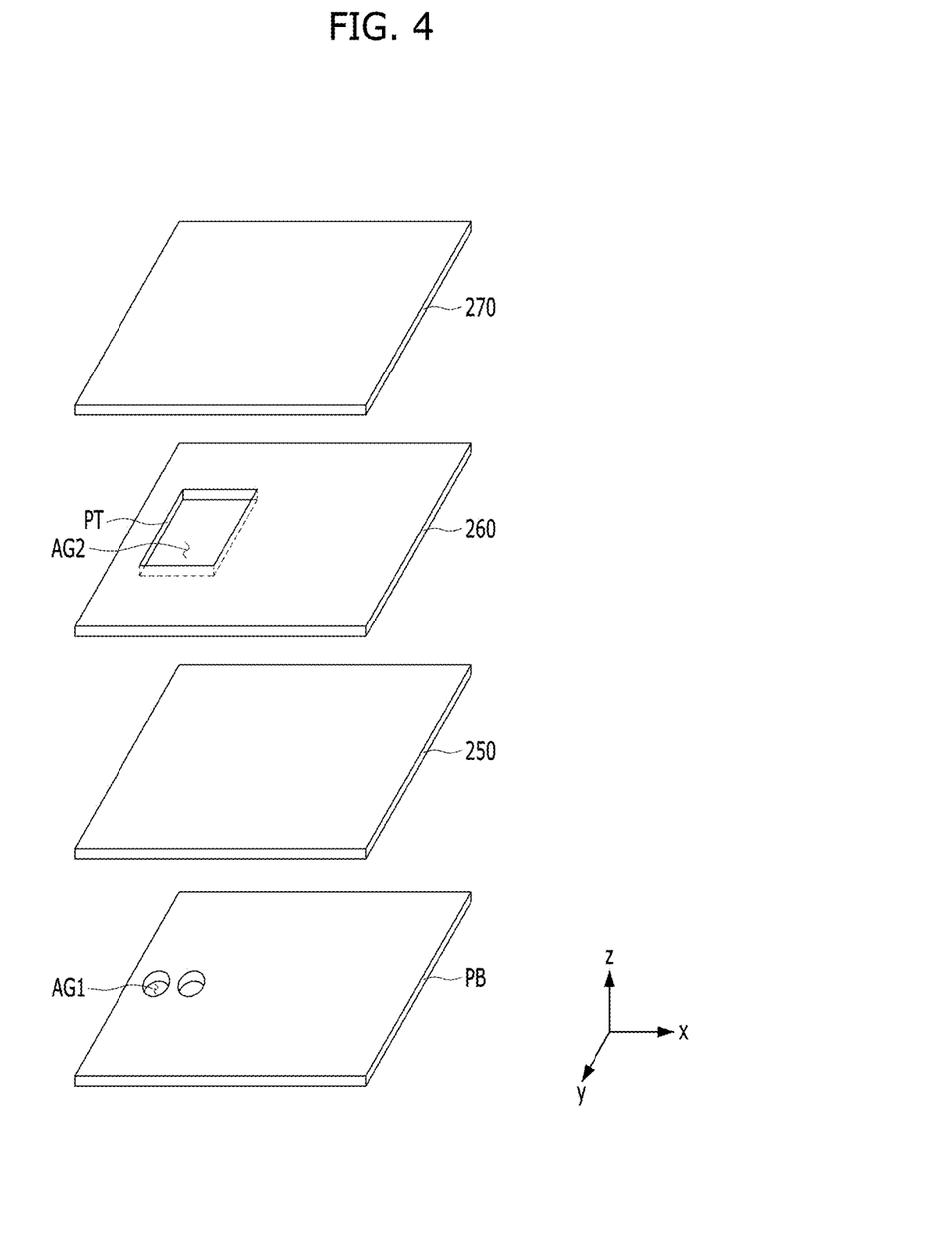
FIG. 4 is an exploded perspective view illustrating an example of a cluster structure according to one embodiment of the present invention.

FIG. 4 is an exploded perspective view illustrating the example of the cluster structure according to one embodiment of the present invention.

Referring to FIGS. 3 and 4, phase axes of light respectively transmitted by the lower polarizing layer PB and the upper polarizing layer PU may intersect each other in a plane. For example, a phase difference between the phase axes of light respectively transmitted by the lower polarizing layer PB and the upper polarizing layer PU may be 90 degrees, without being limited thereto. Here, at least a portion of each of regions of the lower polarizing layer PB, overlapping regions in which the respective warning lights 111 and 112 are displayed, is cut, i.e., removed, and may thus be replaced by a first air gap AG1 (or a through hole).

The reason why the first air gaps AG1 are formed only in the lower polarizing layer PB is as follows.

If both the upper polarizing layer PU and the lower polarizing layer PB are cut and removed based on the arrangement positions of the warning lights 111 and 112, a driver can see inside the cluster through the cover glass 290 and thus the aesthetics of the cluster may be deteriorated. On the other hand, if both the upper polarizing layer PU and the lower polarizing layer PB remain even at the arrangement positions of the warning lights 111 and 112, the phases of the respective polarizing layers PU and PB cross each other and thus it is difficult for light emitted from the second light sources 311 and 312 to be emitted to the outside through the cover glass 290. Otherwise, if the upper polarizing layer PU remains and the lower polarizing layer PB is cut and removed from the arrangement positions of the warning lights 111 and 112, an amount of light incident from the outside through the upper polarizing layer PU is reduced and thus the inside of the cluster may not be visible from the outside, and simultaneously, the light emitted by the second light sources 311 and 312 may reach the outside.

The segment LCD panel 250, 260 and 270 may include a lower glass 250, a liquid crystal layer 260 arranged on the lower glass 250, and an upper glass 270 arranged on the liquid crystal layer 260. The liquid crystal layer 260 may include a liquid crystal region, into which liquid crystals LC are injected, and a liquid crystal dam region, into which injection of the liquid crystals LC is blocked by a second partition PT, so that no liquid crystals are present therein. That is, the second partition PT may serve as a boundary between the liquid crystal region and the liquid crystal dam region.

For example, the liquid crystal dam region, into which a separate filler is not injected, may be referred to as a second air gap AG2, and one liquid crystal dam region AG2 may overlap at least one warning light 111 or 112 in the vertical direction. The reason why the liquid crystal dam region AG2 is arranged is to discharge light emitted by the second light sources 311 and 312 to the outside regardless of driving of the segment LCD 250, 260 and 270.

Although FIG. 4 illustrates the liquid crystal dam region AG2 as being surrounded by the second partition PT and being located in the central portion of the liquid crystal region, the liquid crystal dam region AG2 is not limited to this shape, and may have any shape which is capable of preventing injection of the liquid crystals. For example, if the liquid crystal dam region AG2 is arranged at one edge of the liquid crystal layer 260, the second partition PT is not arranged at the corresponding edge.

The shielding layer 280 is arranged on the upper polarizing layer PU. The shielding layer 280 may be provided on the lower surface of the cover glass 290 arranged on the shielding layer 280 by a designated printing technique (for example, silkscreen printing). The shielding layer 280 may be arranged in regions in a plane other than regions corresponding to the predetermined kinds of warning lights 111 and 112 and the shapes of the respective segments 113 of the segment LCD, so as to serve to visually shield the regions other than the warning lights 111 and 112 and the respective segments 113 from the outside.

Therefore, the shapes of the respective warning lights 111 and 112, which are seen from the outside of the cluster, may be determined by the shapes of through holes formed through the shielding layer 280. For example, in the case of an ABS warning light, regions corresponding to letters "ABS" may not be printed with silkscreen printing dyes and regions other than the letters may be printed with the silkscreen printing dyes.

The cover glass 290 located as the uppermost layer may be formed of a light-transmissive material, and a coating layer (not shown) for preventing scratches or light reflection may be further arranged on the upper surface of the cover glass 290.

Due to the above-described cluster structure, although the entirety of the remaining region (i.e., the second region) other than the first region, in which the first-type display panel capable of expressing a free graphic image is arranged, is formed of the segment LCD panel, warning lights, the operating states of which need to be monitored, may be freely arranged in the second region. That is, since some of the polarizing layers and the liquid crystals are not arranged in the light emission paths of light sources corresponding to the warning lights, which require monitoring of the operating states thereof, light emitted from the corresponding light sources is discharged to the outside as it is without an intermediate medium, and thus results of monitoring by a light source driver are reliable. Consequently, the cluster according to one embodiment of the present invention may enable design freedom while satisfying safety regulations.

The present invention may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state disk (SSD), a silicon disk drive (SDD), a ROM, a RAM, a CD-ROM, a magnetic tape, a floppy disk, an optical data storage device, etc.

As is apparent from the above description, a cluster according to at least one embodiment of the present invention allows only specific warning lights to respectively use light sources, the operating states of which may be monitored through a driver, and liquid crystals of a segment LCD are not arranged in the light emission paths of the corresponding light sources, thereby being capable of satisfying safety regulations.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus comprising:
   a segment liquid crystal display (LCD) panel comprising a plurality of segments, a liquid crystal region comprising liquid crystals, and a liquid crystal dam region configured such that the liquid crystals are not arranged therein;
   a substrate arranged under the segment LCD panel;
   a first light source, corresponding to a backlight of the segment LCD panel, arranged on the substrate; and
   a second light source, lighting of which is individually controlled, arranged on the substrate, wherein the liquid crystal dam region overlaps the second light source in a vertical direction.

2. The apparatus according to claim 1, wherein the second light source corresponds to a warning light.

3. The apparatus according to claim 2, wherein the warning light comprises a driving or brake-related warning light.

4. The apparatus according to claim 2, further comprising a driver configured to drive the second light source, wherein the second light source comprises a light emitting diode and the driver is configured to monitor an operating state of each of the light emitting diodes.

5. The apparatus according to claim 2, further comprising a cover glass arranged on the segment LCD panel.

6. The apparatus according to claim 1, further comprising:
   an upper polarizing layer arranged on the segment LCD panel; and
   a lower polarizing layer arranged under the segment LCD panel.

7. The apparatus according to claim 6, wherein a through hole is formed through the lower polarizing layer at a position configured to overlap the second light source in the vertical direction.

8. The apparatus according to claim 6, further comprising a light control layer arranged under the lower polarizing layer so as to adjust a viewing angle.

9. The apparatus according to claim 6, wherein a phase axis of light transmitted by the upper polarizing layer and a phase axis of light transmitted by the lower polarizing layer intersect each other.

10. The apparatus according to claim 6, further comprising a diffuser arranged between the lower polarizing layer and the substrate.

11. The apparatus according to claim 10, further comprising a first partition arranged between the second light source and the first light source, the first partition interposed between the substrate and the diffuser.

12. The apparatus according to claim 1, wherein the segment LCD panel further comprises a second partition arranged between the liquid crystal region and the liquid crystal dam region and configured to prevent the liquid crystals from entering the liquid crystal dam region.

13. The apparatus according to claim 1, further comprising a thin film transistor (TFT)-LCD panel arranged in a plane so as not to overlap the segment LCD panel.

14. An apparatus comprising:
a liquid crystal display (LCD) panel comprising a lower glass, an upper glass and a liquid crystal region between the lower glass and the upper glass, the liquid crystal region comprising liquid crystals in portions thereof;
a substrate arranged under the LCD panel;
a first light source arranged on the substrate beneath a portion of the liquid crystal region that have liquid crystals disposed therein, the first light source corresponding to a backlight of the LCD panel; and
a plurality of second light sources arranged on the substrate, each second light source located beneath a portion of the liquid crystal region that has no liquid crystals disposed therein, wherein lighting of each second light source is individually controllable.

15. The apparatus according to claim 14, wherein each second light source corresponds to a warning light.

16. The apparatus according to claim 15, wherein the warning lights comprise driving and brake-related warning lights.

17. The apparatus according to claim 15, wherein the second light source comprise light emitting diodes, the apparatus further comprising a plurality of LED drivers, each LED driver configured to drive an associated second light source and to monitor an operating state of the associated second light source.

18. The apparatus according to claim 15, further comprising a cover glass arranged on the LCD panel and a shielding layer arranged under the cover glass in regions other than regions corresponding to warning lights.

19. The apparatus according to claim 14, further comprising:
an upper polarizing layer arranged on the LCD panel; and
a lower polarizing layer arranged under the LCD panel, wherein a through hole is formed through the lower polarizing layer at a position configured to overlap each second light source in a vertical direction.

* * * * *